(12) United States Patent
Yang et al.

(10) Patent No.: US 9,297,196 B2
(45) Date of Patent: Mar. 29, 2016

(54) LIFT AND ROTATION MECHANISM FOR QUICK DOOR-OPENING DEVICE

(75) Inventors: Yunlan Yang, Langfang (CN); Feng Zou, Langfang (CN); Meng Li, Langfang (CN); Wenyong Li, Lanfang (CN)

(73) Assignees: CHINA NATIONAL PETROLEUM CORPORATION, Beijing (CN); CHINA PETROLEUM PIPELINE BUREAU, Langfang (CN); CHINA PETROLEUM PIPELINE MACHINERY MANUFACTURING CO., LTD., Langfang (CN)

( * ) Notice: Subject to any disclaimer, the term of this patent is extended or adjusted under 35 U.S.C. 154(b) by 0 days.

(21) Appl. No.: 14/365,518

(22) PCT Filed: Aug. 3, 2012

(86) PCT No.: PCT/CN2012/001043
§ 371 (c)(1),
(2), (4) Date: Jun. 13, 2014

(87) PCT Pub. No.: WO2013/086776
PCT Pub. Date: Jun. 20, 2013

(65) Prior Publication Data
US 2014/0373452 A1  Dec. 25, 2014

(30) Foreign Application Priority Data
Dec. 16, 2011 (CN) .......................... 2011 1 0425094

(51) Int. Cl.
*E05F 15/603* (2015.01)
*F16J 13/22* (2006.01)
*E06B 5/12* (2006.01)

(52) U.S. Cl.
CPC ............... *E05F 15/603* (2015.01); *E06B 5/12* (2013.01); *F16J 13/22* (2013.01)

(58) Field of Classification Search
CPC ............. F16J 13/02; F16J 13/04; F16J 13/08; F16J 13/10; F16J 13/12; F16J 13/16; F16J 13/20; F16J 13/22; E06B 3/509; E06B 3/52; E05F 15/603; E05F 15/63; E05F 15/631; E05F 15/638; E05F 15/649; E05F 15/652; E05F 15/665; E05F 15/673; E05F 15/678
See application file for complete search history.

(56) References Cited

U.S. PATENT DOCUMENTS 3,302,821 A * 2/1967 Loomis .......................... 220/288
4,055,274 A * 10/1977 Waldenmeier et al. ..... 220/256.1
(Continued)

FOREIGN PATENT DOCUMENTS

| CN | 2557237 | 6/2003 |
|----|---------|--------|
| CN | 2918901 | 7/2007 |

(Continued)

OTHER PUBLICATIONS

Chen Ping, et al. "New Quick Opening Blind Plate Structure with "D" Sectional Shape Bolts and Double "O" Seal Ring", Chemical Equipment & Piping, (College of Mechanical and Electrical Engineering, Beijing University of Chemical Technology), 2010, 47(3): 16-18.

(Continued)

*Primary Examiner* — Jerry Redman
*Assistant Examiner* — Catherine A Kelly
(74) *Attorney, Agent, or Firm* — Loza & Loza, LLP; Michael F. Fedrick

(57) ABSTRACT

Disclosed is a lift and rotation mechanism for a quick door-opening device. The power-output end of a first motor of a lift component of the mechanism is connected to one end of a screw rod and the other end of the screw rod is connected to one end of a circular pipe; one end of a tubular body is provided with a connection component, with one end of a coupling component being connected to the connection component; the other end of the circular pipe is removably connected to a circular door by an annular connection; the output shaft of a second motor of a rotary component is removably connected to one end of a rotary shaft provided within a supporting seat removably connected to an end flange; and a circular disk is removably connected to the other end of the rotary shaft and is fixedly connected to the connection component.

9 Claims, 8 Drawing Sheets

(56) References Cited

U.S. PATENT DOCUMENTS

| | | | |
|---|---|---|---|
| 4,135,640 A | | 1/1979 | MacQuilkin et al. |
| 4,669,628 A | * | 6/1987 | Hatta ........................ 220/211 |
| 5,290,076 A | | 3/1994 | Smith |
| 5,585,000 A | | 12/1996 | Sassi |
| 5,918,756 A | * | 7/1999 | Morgan ....................... 220/263 |
| 6,085,935 A | * | 7/2000 | Malchow et al. ............ 220/813 |
| 6,228,225 B1 | * | 5/2001 | Meher-Homji .............. 202/250 |
| 6,331,196 B1 | | 12/2001 | Alperovitch |
| 7,093,733 B2 | * | 8/2006 | Nishimura et al. .......... 220/236 |
| 8,430,260 B2 | * | 4/2013 | Guidry, Jr. ................... 220/298 |
| 2012/0000917 A1 | * | 1/2012 | Ovnicek ................. 220/592.01 |
| 2012/0267367 A1 | * | 10/2012 | Armau et al. ............. 220/23.83 |
| 2012/0292311 A1 | * | 11/2012 | Armau et al. .................. 220/3.2 |
| 2012/0325812 A1 | * | 12/2012 | Guinart Pallares et al. .. 220/212 |
| 2013/0025209 A1 | * | 1/2013 | Lidster et al. .................. 49/359 |

FOREIGN PATENT DOCUMENTS

| | | |
|---|---|---|
| CN | 201025326 | 2/2008 |
| CN | 201297383 | 8/2009 |
| CN | 201366381 | 12/2009 |
| CN | 201374509 | 12/2009 |
| CN | 201401602 | 2/2010 |
| CN | 201475315 | 5/2010 |
| JP | H10338257 | 12/1998 |
| JP | 2001304415 | 10/2001 |
| JP | 2003139244 | 5/2003 |
| JP | 2011179531 | 9/2011 |
| RU | 2003134690 | 5/2005 |

OTHER PUBLICATIONS

Jin Wei, et al., "High-pressure natural gas / gas ultra-purification device practical application", Chemical Engineering of Oil & Gas, 33(5):382-386 (2004).

Jones, J.W. et al. "Concerning the failure of a high pressure natural gas filter separator", (Silverado Software & Consulting Inc), Experimental Mechanics, vols. 1 and 2—Advances in design, testing and analysis, 1998: 397-404.

Li Lian-wei and Qu Chang-long, Development and Application of a Quick Opening Closure, Petroleum Engineering Construction, 33(2):76-77 (2007).

Pechacek, R. "High Pressure, Quick Acting Closure for Large Diameter, Full Opening, Nuclear and Petro-Chem Pressure Vessels"; American Society of Mechanical Engineers, 1978, 78-PVP-74.

Bandlock 2 Quick Opening Closure, GD Engineering, Issued Jan. 2013 [http://www.gdengineering.com/bandlock2.asp], 8 pages.

Novelty search report with English translation for Chinese Patent Publication No. 201112010000328 dated Apr. 6, 2011, 15 pages.

Search report for "A lifting and rotating mechanism for a quick opening device," Patent Search and Consulting Center of the SIPO, Oct. 28, 2011, 8 pages.

* cited by examiner

LIFT AND ROTATION MECHANISM FOR QUICK DOOR-OPENING DEVICE

CROSS-REFERENCE TO RELATED APPLICATIONS

This application is a national phase of International Application No. PCT/CN2012/001043, filed on Aug. 3, 2012, which claims priority to Chinese Patent Application No. 201110425094.3, filed on Dec. 16, 2011. The Chinese Patent Application is incorporated by reference in its entirety.

TECHNICAL FIELD

The present disclosure relates to a lift and rotation mechanism for a quick door-opening device, and pertains to a technical field of piping systems.

BACKGROUND

With the rapid development of Chinese national economy, quick door-opening devices are widely popularized and applied in such fields of light industry and heavy industry as petrochemicals, pharmaceuticals, food hygiene, and nuclear electricity, etc. Lift and rotation mechanisms are key components guaranteeing the safe operation of quick door-opening devices, and their safe running concerns the safety of people's lives and assets.

There are many documents and reports concerning the research and development of quick opening blind disks both within and outside China, for instance, a clamp-type quick opening blind disk, which is provided, at both ends of its opening screw supporting mechanism, with a radial ball bearing and a thrust ball bearing, and which employs two, namely a primary and a secondary, bearing supporting mechanisms, whereby is reduced the operative force of the quick opening blind disk and is facilitated the use under upright operational conditions; and a quick opening blind disk for large-diameter high-pressure containers, including an in-built concentric ring secured by radial pins that are conducive to reducing the prestress of bolts, thus enabling quick opening and closing of the blind disk. Main characteristics of the above blind disk rest in the fact that the lift and rotation mechanisms of the large-scale upright quick opening blind disks are electrically driven to achieve automation, safety and high efficiency and solve the difficult problem that cranes must be hired to open large-caliber high-pressure upright quick opening blind disks worldwide. Documents containing technical features identical with those described above have not been found both within and outside China.

Disclosed in CN2918901Y is a lift and rotation mechanism for a quick door-opening device, whereby although lift and rotation of the quick door-opening device can be achieved and the structure is also simple, the lift components thereof are merely restricted to a screw rod and a tubular body, and only a rotary shaft and a supporting seat rotate, so the quick opening objective cannot be achieved.

SUMMARY

Figure 1:
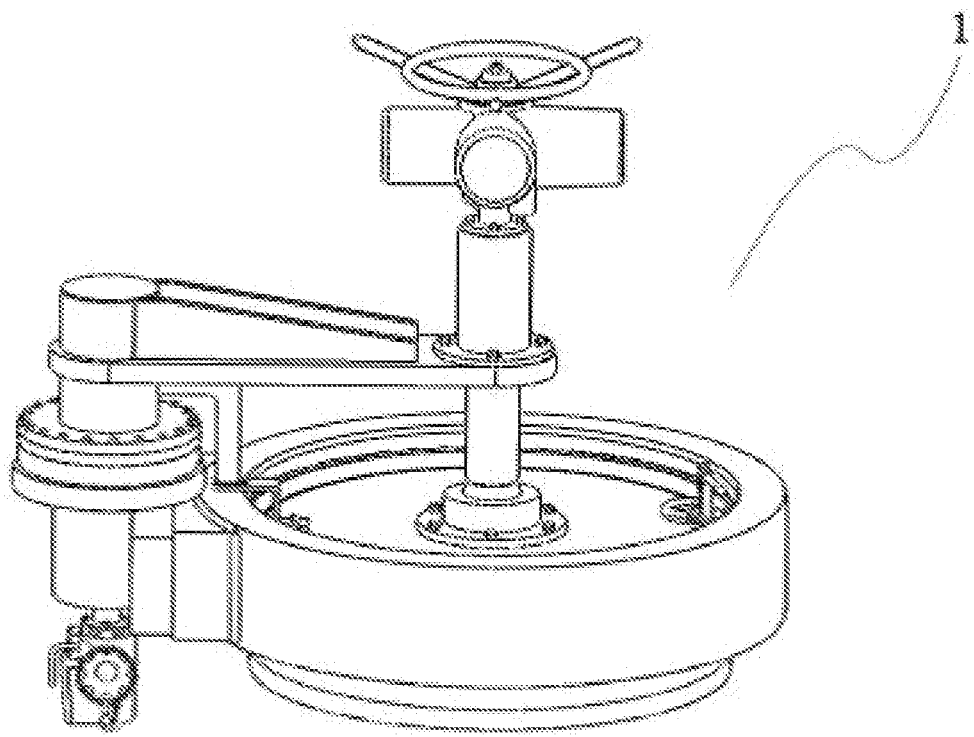
FIG. 1 is a schematic diagram illustrating the lift and rotation mechanism used on a quick door-opening device.

In the drawings:
1 (stands for)—lift and rotation mechanism
2—lift component
3—rotary component
4—coupling component
5—movable circular door
6-7—shaped guide plate
21—first motor
22—screw rod
23—tubular body
24—circular pipe
25—annular connection plate
26—connection component
27—bidirectional flange
28—bushing
29—T-shaped block
31—second motor
32—rotary shaft
33—supporting seat
34—circular disk
41—bar-shaped plate
42—tubular connection
43—reinforcing member
51—end flange
61—z-shaped guide plate
241—spherical structure
242—slot
251—flange
261—opening
281—opening
331—wing plate
611—notch

DETAILED DESCRIPTION

Structures in the prior art cannot achieve automatic lift and rotation of large-scale upright quick door-opening devices; applications in places of the petrochemical industry all require explosion protection, and large-scale upright equipments are great in height, so a large explosion-proof crane must be hired to hoist up the door of the quick door-opening device and transfer it from the air to the ground, and the aid of the crane is again called for to lift the door up in the air after completion of equipment maintenance to be then placed in the proper position only after adjustment by human hands all these increase the cost of maintenance and imply potential safety hazards, and quick opening is rendered meaningless.

Some embodiments of the present invention provide a lift and rotation mechanism for a quick door-opening device that is simply operable, safe and reliable, and capable of realizing quick opening and closing of large-scale upright quick door-opening.

Like the case of the prior art, the present disclosure relates to a quick door-opening device and a lift and rotation mechanism. The lift and rotation mechanism is connected to the quick door-opening device.

The quick door-opening device includes a movable circular door.

The lift and rotation mechanism comprises a lift component, a rotary component, and a coupling component. The lift component is installed at the middle of the movable circular door and is arranged to move the circular door along a vertical direction. The rotary component rotates the quick door-opening device and the lift component in a horizontal direction. The coupling component is fixedly coupled at one end to the lift component, and fixedly coupled at the other end to the rotary component.

The lift component comprises a first motor, a screw rod, a tubular body, a circular pipe, and an annular connection. A power-output end of the motor is connected to one end of the screw rod to drive the screw rod, and the other end of the screw rod is connected to one end of the circular pipe to bring the circular pipe into motion along the vertical direction. The tubular body is provided at one end with a connection portion, the connection portion is fixedly connected to the one end of the coupling component via screws, and parts of the circular pipe and the screw rod are disposed within the tubular body; the annular connection removably and fixedly connects the other end of the circular pipe to the circular door.

The lift component further comprises a bushing disposed in the tubular body to reduce friction with the circular pipe during the lifting process. During lifting and falling processes, the circular pipe cooperates with the bushing to guide the movement in the vertical direction, and to prevent lateral force from acting on the screw rod, to thereby protect the screw rod.

It is also possible to use a bidirectional flange to fixedly connect the first motor and the tubular body to each other. Of course, these two can also be connected by using other connection means.

The circular pipe is shaped as a cylinder with the other end being a spherical structure. The annular connection plate is a ring with a flange, and the spherical structure is accommodated within the flange when the annular connection plate fixedly connects the other end of the circular pipe.

The lift component further comprises a T-shaped block. The tubular body as well as its connection portion and the bushing sheathed therein are provided with openings, and the circular pipe is provided with a slot at a side thereof; the leg of the T-shaped block passes through the openings to mate with the slot for direction guiding during the lifting process.

The lift and rotation mechanism further comprises a 7-shaped guide plate and a z-shaped guide plate, an end of the 7-shaped guide plate extending horizontally is fixedly connected to the coupling component, an end of the z-shaped guide plate is fixedly connected to the circular door, and the other end of the z-shaped guide plate is provided with a notch cooperative with an end of the 7-shaped guide plate extending vertically, for guiding in the vertical direction. The circular pipe can be prevented from rotation by means of the aforementioned guiding structure. The 7-shaped guide plate is connected at a central portion of the bar-shaped plate.

The fixed connection herein is a connection effected by means of welding or by employing cooperation of bolts with screw holes, or by using other connection means.

The rotary component comprises a second motor, a rotary shaft, a supporting seat, and a circular disk. An output shaft of the second motor is removably connected to one end of the rotary shaft to drive the rotary shaft. The rotary shaft is disposed in the supporting seat, and the supporting seat is removably connected to an end flange of the quick door-opening device. The circular disk is removably and fixedly connected to the other end of the rotary shaft, and the circular disk is fixedly connected to the coupling component.

The rotary shaft is a multi-stepped rotary shaft that can reduce stress concentration, and achieve smooth transmission of torque. As compared with an ordinary rotary shaft, the multi-stepped rotary shaft is reduced in size and weight to make the system structurally compact, to thereby prevent it from being restricted by narrow operation space. The smaller end of the multi-stepped rotary shaft is connected to the output end of the second motor.

Wing plates formed in one piece at both sides of the supporting seat can be fixedly connected to the quick door-opening end flange, so that the supporting seat is fixed on the end flange.

The coupling component comprises a bar-shaped plate, a tubular connection, and a reinforcing member. The bar-shaped plate is provided with openings at both ends thereof, with the opening at one end being past through by the circular pipe, and the opening at the other end being past through by the tubular connection, and the tubular connection is welded with the bar-shaped plate. The reinforcing member is welded respectively with the bar-shaped plate and with the tubular connection above the bar-shaped plate to enhance the rigidity of the bar-shaped plate.

In the following description of the embodiments made with reference to the accompanying drawings, these and/or other aspects and advantages of the exemplary embodiments according to the present disclosure will become apparent and more easily comprehensible.

EMBODIMENTS

Embodiments of the present invention will be described in greater detail below with reference to the accompanying drawings, in which the same reference numerals correspond to the same component parts. However, there may be many different embodiments for the present invention, and the present disclosure could not be construed to be defined only by the embodiments described hereinbelow. Rather, it is merely meant by the embodiments provided in the present disclosure that the contents of the present disclosure are overall and complete, and that the concepts of the present disclosure are entirely conveyed to those skilled in the art.

As shown in FIG. 1, which is a schematic diagram illustrating the lift and rotation mechanism 1 in this embodiment installed on a quick door-opening device, through the control of the lift and rotation mechanism 1 are realized lift of a circular door and a translational operation performed after the lift.

Figure 2:
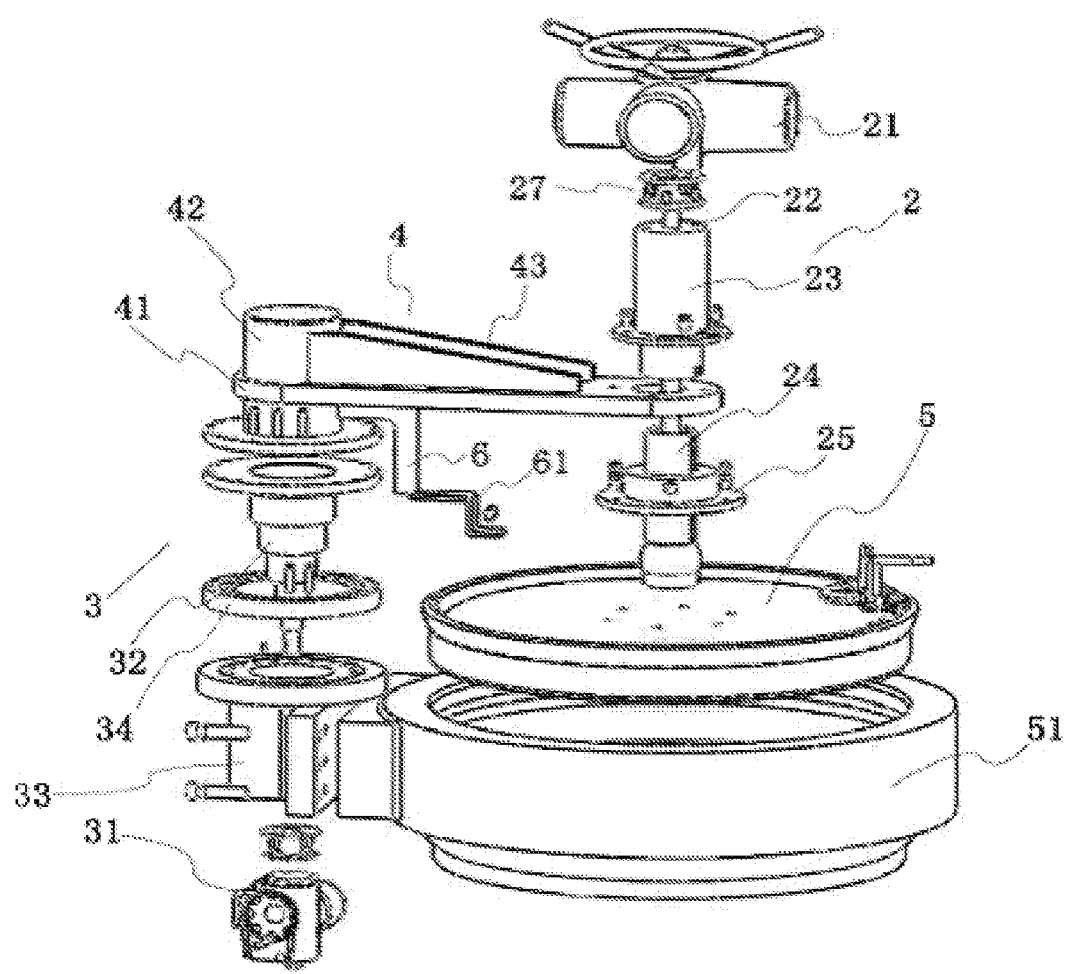
FIG. 2 shows an exploded view of the lift and rotation mechanism.

As shown in FIG. 2, the lift and rotation mechanism 1 includes a lift component 2, a rotary component 3, and a coupling component 4. The quick door-opening device includes a circular door 5. The lift component 2 is arranged to move the circular door 5 along a vertical direction; the rotary component 3 rotates the quick door-opening device and the lift component 2 at a horizontal direction. As shown in FIG. 1, the coupling component 4 is fixedly coupled at one end to the lift component 2, and fixedly coupled at the other end to the rotary component 3.

Figure 3:
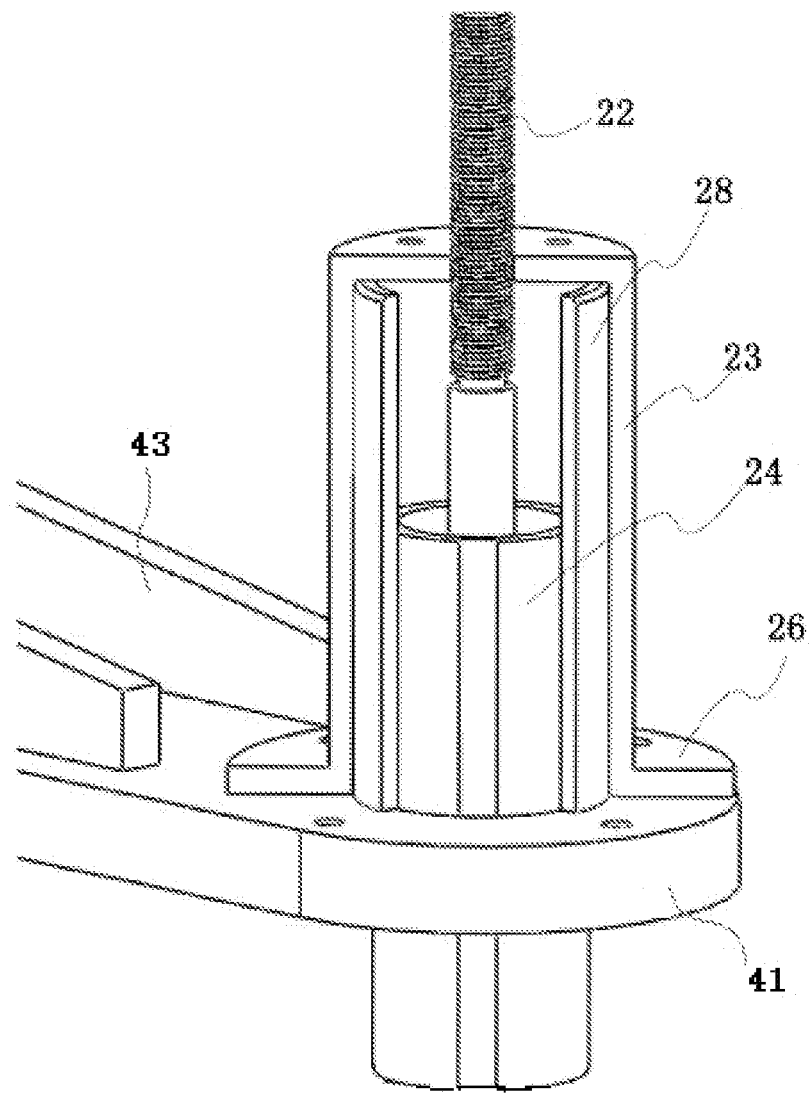
FIG. 3 is a drawing with partial enlargement of the lift and rotation mechanism.

The lift component 2 (see FIG. 2) includes a first motor 21 of the type, such as, 380V-0.07 kw-0.75A, a screw rod 22 of the specification, such as, Tr44×8 mm, a tubular body 23, a circular pipe 24, and an annular connection 25. A power-output end of the first motor 21 is connected to one end of the screw rod 22 to drive the screw rod 22; and the other end of the screw rod 22 is connected to one end of the circular pipe 24 to bring the circular pipe 24 into motion along the vertical direction. More details are as shown in FIG. 3, which is a drawing with partial enlargement of the lift and rotation mechanism 1. The tubular body 23 is provided at one end with a connection portion 26. The connection portion 26 is fixedly connected to the one end of the coupling component 4 via screws, and parts of the circular pipe 24 and the screw rod 22 are disposed within the tubular body 23. The annular connection 25 removably and fixedly connects the other end of the circular pipe 24 to the circular door 5.

According to some embodiments of the present invention, it is also possible to use a bidirectional flange 27 to fixedly connect the motor 21 and the tubular body 23 to each other and it is also possible that the motor 21 and the tubular body 23 are connected by using other connection means.

Figure 4:
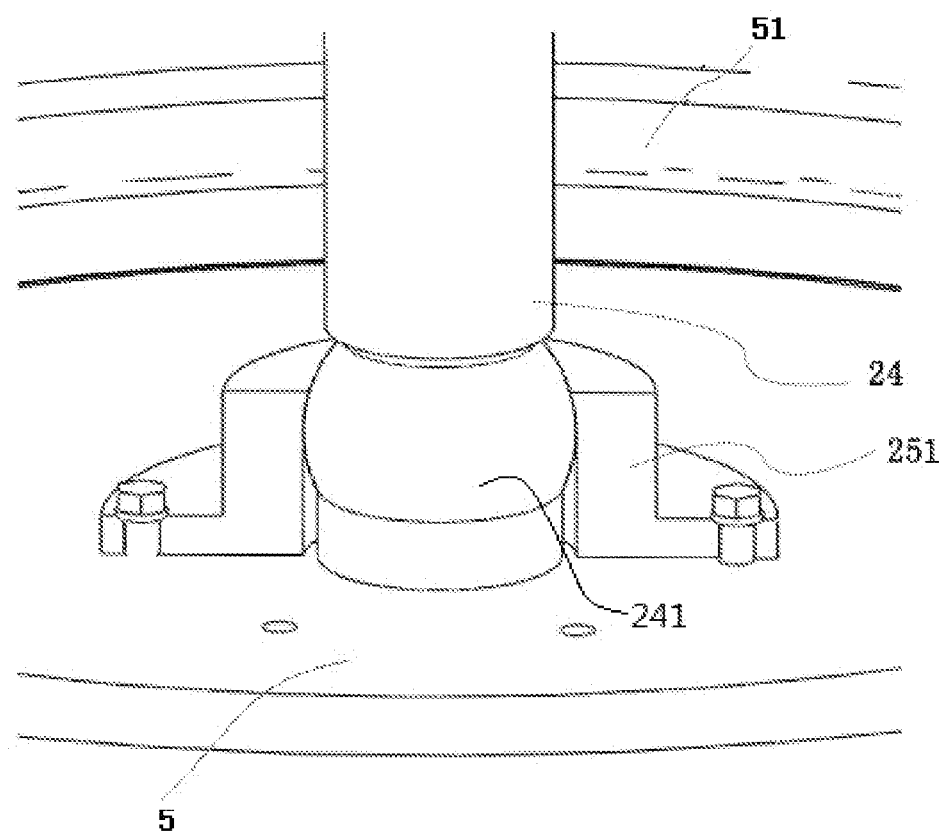
FIG. 4 is a drawing with partial enlargement of the lift and rotation mechanism.

FIG. 4 is a drawing with partial enlargement of the lift and rotation mechanism according to some embodiments of the present invention. The circular pipe 24 is configured to have a spherical structure 241 at the other end, the annular connection plate 25 has a flange 251, and the spherical structure 241 is accommodated within the flange 251 when the annular connection plate 25 fixedly connects the other end of the circular pipe 24.

According to some embodiments of the present invention, the lift component 2 is installed at the middle of the circular door, and the spherical structure of the circular pipe 24 has the function of universal adjustments, thus avoiding the circumstance in which the circular door 5 is stuck in an end flange 51 after tilting and is hence difficultly lifted, As shown in FIG. 3, the lift component 2 further includes a bushing 28 disposed in the tubular body 23 to reduce friction with the circular pipe 24 during the lifting process. According to some embodiments of the present invention, during lifting and falling processes, the circular pipe 24 cooperates with the bushing 28 to guide the movement in the vertical direction, and to prevent lateral force from acting on the screw rod 22, to thereby protect the screw rod 22.

Figure 5:
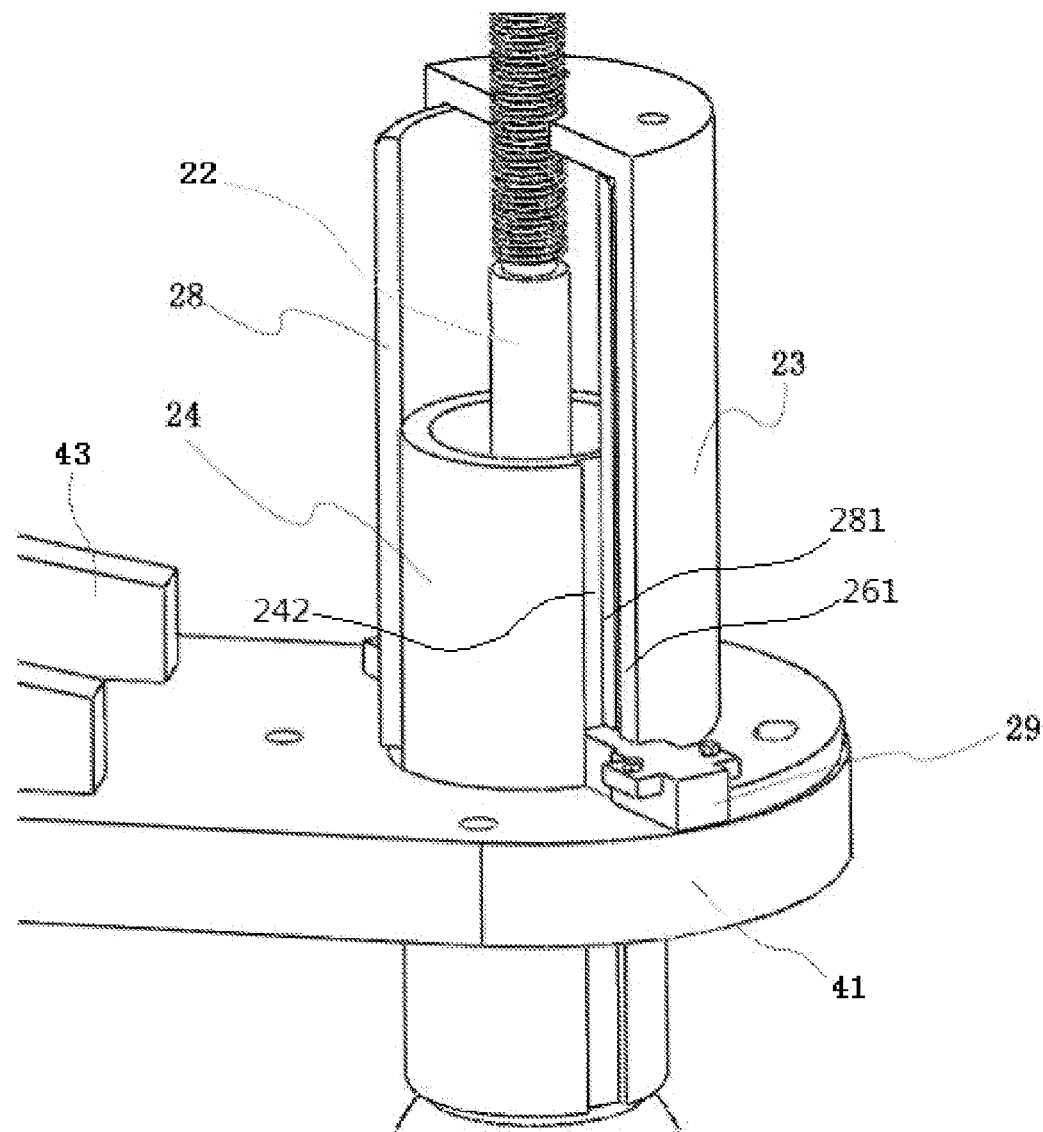
FIG. 5 is a drawing with partial enlargement of the lift and rotation mechanism.

As shown in FIG. 5, the lift component 2 further includes a T-shaped block 29. each of the connection portion 26 of the tubular body 23 and the bushing 28 is provided with an opening 261, 281, and the circular pipe 24 is provided with a slot 242 at a side thereof. A leg of the T-shaped block 29 passes through the openings 261, 281 to mate with the slot 242 for guiding during the lifting process.

The coupling component 4 (see FIG. 2) includes a bar-shaped plate 41, a tubular connection 42, and a reinforcing member 43. The bar-shaped plate 41 is provided with openings at both ends thereof, with the opening at one end being past through by the circular pipe 24, and the opening at the other end being past through by the tubular connection 42. The tubular connection 42 is welded with the bar-shaped plate 41, and the reinforcing member 43 is welded respectively with the bar-shaped plate 41 and with the tubular connection 42 above the bar-shaped plate 41 to enhance the rigidity of the bar-shaped plate 41.

Figure 6:
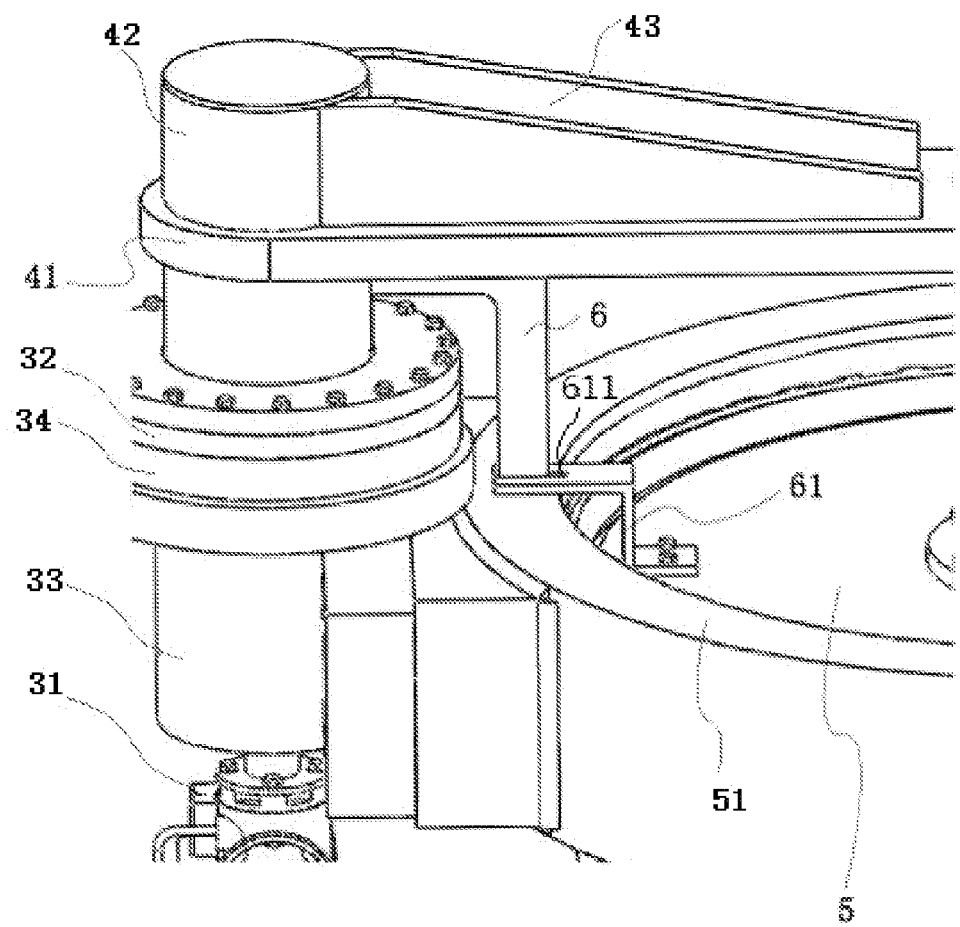
FIG. 6 is a drawing with partial enlargement of the lift and rotation mechanism.

As shown in FIG. 6, the lift and rotation mechanism 1 further includes a 7-shaped guide plate 6 and a z-shaped guide plate 61. An end of the 7-shaped guide plate 6 extending horizontally is fixedly connected to the coupling component 4. One end of the z-shaped guide plate 61 is fixedly connected to the circular door 5. and the other end of the z-shaped guide plate 61 is provided with a notch 611 mating with an end of the 7-shaped guide plate 6 extending vertically. The circular pipe 24 can be prevented from rotation by means of the aforementioned guiding structure. This fixed connection is welding.

According to some embodiments of the present invention, as shown in FIG. 6, the 7-shaped guide plate 6 is connected at a central portion of the bar-shaped plate 41.

As shown in FIG. 2, the rotary component 3 includes a second motor 31 of the type, such as, 380V-0.25 kw-1.9A, a rotary shaft 32 with, such as, φ42 mm, a supporting seat 33, and a circular disk 34. An output shaft of the second motor 31 is removably connected to one end of the rotary shaft 32 to drive the rotary shaft 32, the rotary shaft 32 is disposed in the supporting seat 33, and the supporting seat 33 is removably connected to the end flange 51 of the quick door-opening device. The circular disk 34 is removably and fixedly connected to the other end of the rotary shaft 32, and the circular disk 34 is fixedly connected to the coupling component 4.

Figure 7:
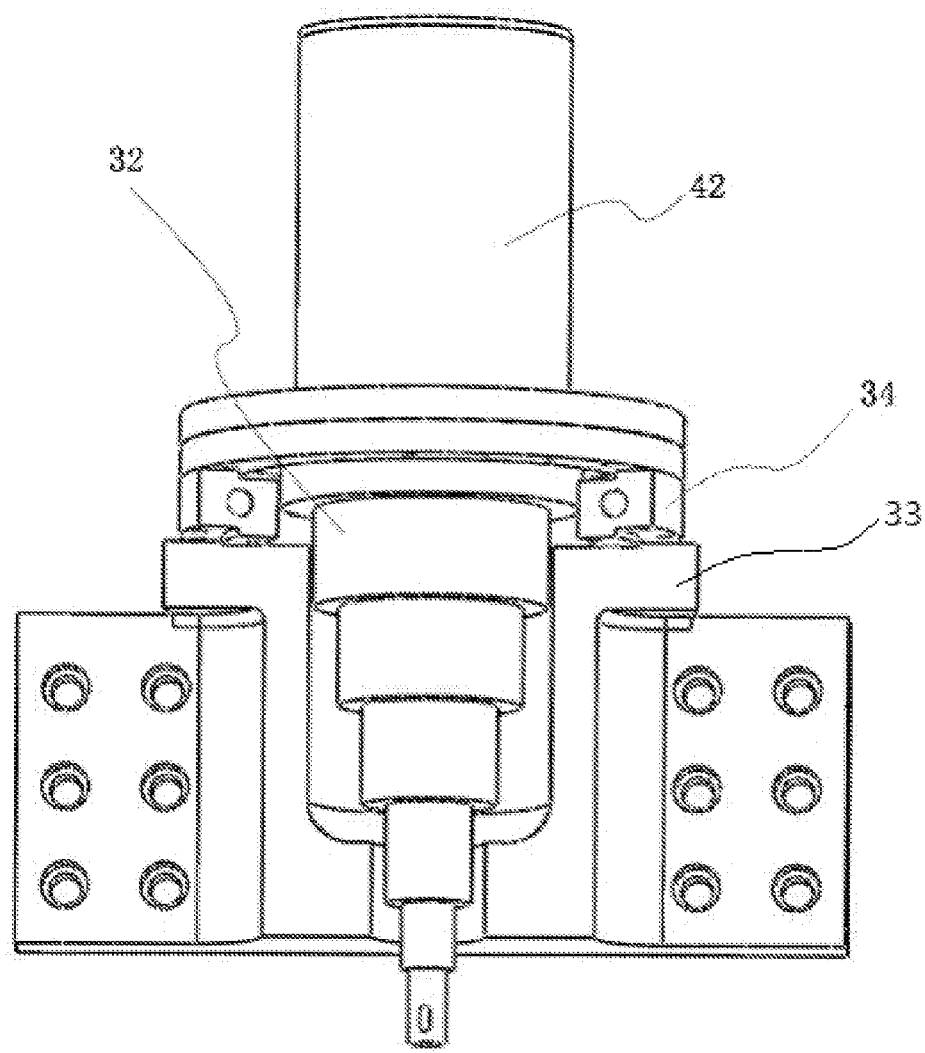
FIG. 7 is a schematic diagram illustrating partial components of the lift and rotation mechanism.

As shown in FIG. 7, the rotary shaft 32 is a multi-stepped rotary shaft whose smaller end is connected to the output end of the second motor 31.

Figure 8:
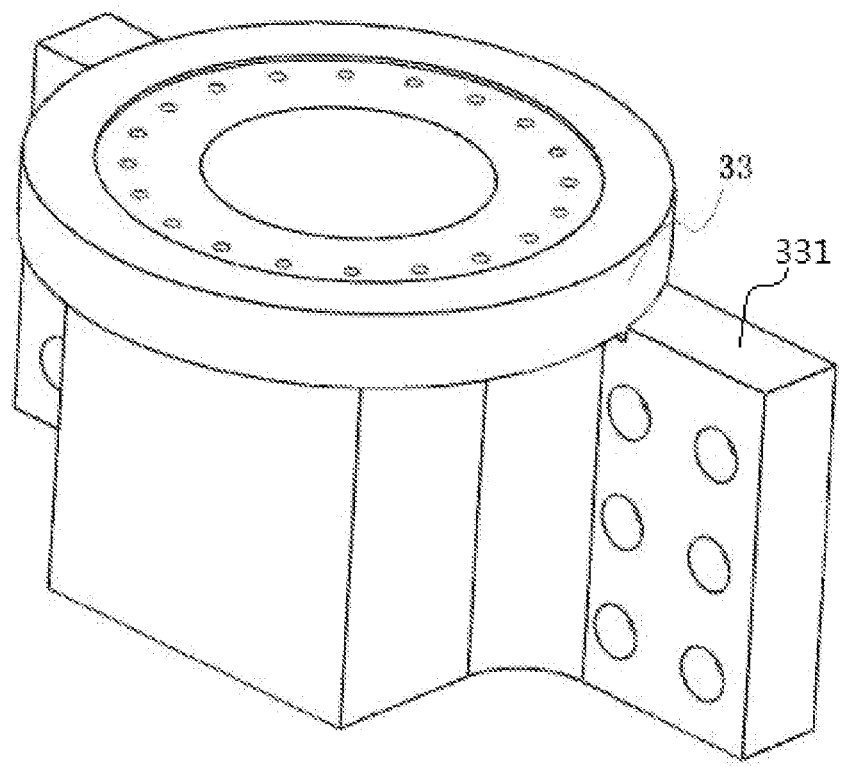
FIG. 8 is a schematic diagram illustrating the supporting seat.

FIG. 8 shows the supporting seat 33 in the rotary component 3. The supporting seat 33 is fixed on the end flange 51 by fixedly connecting wing plates 331 formed in one piece at both sides of the supporting seat 33 to the end flange 51 of the quick door-opening device.

When it is needed to lift the circular door 5 and to translate it after the circular door is lifted to a certain position, the first motor 21 drives the screw rod 22, and the screw rod 22 brings the circular pipe 24 into motion, to thereby lift the circular door 5 in the vertical direction; and after the circular door 5 is lifted to a proper height, the first motor 21 stops running, and the second motor 31 starts to run to thereby drive the multi-stepped rotary shaft 32; a torque is transmitted to the coupling component 4 and the bar-shaped plate 41 in the coupling component 4 rotates and translates the lift component 2 and the circular door 5. When the lift component 2 and the circular door 5 are translated to a proper position, the second motor 31 stops running. Thus completes the opening process of the quick door-opening device. The aforementioned mechanism is used to close the circular door 5 after the maintenance of the quick door-opening device.

An interlocking operation may be performed on the first motor 21 and second motor 31 during the above operational process, i.e., action of one motor is inactivated when action of the other motor has not been completed, so as to further guarantee safety in the operational work.

INDUSTRIAL APPLICABILITY

The mechanism provided by the present disclosure is easily operable, safe and reliable; it can realize quick opening and closing of a large upright quick door-opening device, to thereby provide safety and convenience for the maintenance of the quick door-opening device, further reduce the maintenance cost, and eliminate potential safety hazards.

What is claimed is:
1. A lift and rotation mechanism for a quick door-opening device, the quick door-opening device comprising a movable circular door, an end flange, and the lift and rotation mechanism, wherein the lift and rotation mechanism comprises:
(a) a lift component, wherein the lift component is installed in a central position of an outer surface of the movable circular door and is arranged to move the circular door along a vertical direction, the lift component comprising a first motor, a screw rod, a tubular body, a circular pipe, and an annular connection, wherein:

(i) a power-output end of the first motor is connected to one end of the screw rod and an other end of the screw rod is connected to one end of the circular pipe;

(ii) the tubular body is provided at one end with a connection portion, the connection portion being fixedly connected to one end of a coupling component, wherein parts of the circular pipe and the screw rod are disposed within the tubular body; and (iii) the annular connection removably and fixedly connects an other end of the circular pipe to the circular door;

(b) a rotary component, wherein the rotary component rotates the quick door-opening device and the lift component in a horizontal direction, the rotary component comprising a second motor, a rotary shaft, a supporting seat, and a circular disk, wherein:

(i) an output shaft of the second motor is removably connected to one end of the rotary shaft to drive the rotary shaft;

(ii) the rotary shaft is disposed in the supporting seat, and the supporting seat is removably connected to the end flange of the quick door-opening device; and (iii) the circular disk is fixedly connected to an other end of the rotary shaft, and the circular disk is fixedly connected to the coupling component; and wherein the coupling component comprises a bar-shaped plate, a tubular connection, and a reinforcing member, wherein:

(i) the bar-shaped plate is provided with openings at both ends thereof, with the opening at one end being passed through by the circular pipe and the opening at an other end being passed through by the tubular connection;

(ii) the tubular connection is welded with the a bar-shaped plate; and (iii) the reinforcing member is welded respectively with the a bar-shaped plate and with the tubular connection above the a bar-shaped plate.

2. The lift and rotation mechanism for a quick door-opening device according to claim 1, wherein the lift component further comprises a bushing disposed in the tubular body for guiding.

3. The lift and rotation mechanism for a quick door-opening device according to claim 1, wherein the first motor and the tubular body are fixedly connected to each other by using a bidirectional.

4. The lift and rotation mechanism for a quick door-opening device according to claim 1, wherein the circular pipe is shaped as a cylinder with one end being a spherical structure, and wherein the annular connection is a ring with a flange and the annular connection accommodates the spherical structure of the circular pipe within the flange.

5. The lift and rotation mechanism for a quick door-opening device according to claim 2, wherein the lift component further comprises a guide member which is a T-shaped block, wherein the tubular body, the connection portion, and the bushing lined therein are provided with an opening, respectively, and the circular pipe is provided with a slot at a side thereof, and wherein a leg of the guide member passes through the openings to mate with the slot.

6. The lift and rotation mechanism for a quick door-opening device according to claim 1, wherein the lift and rotation mechanism further comprises a L-shaped guide plate and a guide plate of which an intermediate portion is perpendicular to each of an upper and lower portion, wherein a portion of the L-shaped guide plate extending horizontally is fixedly connected to the coupling component, an end of the guide plate of which an intermediate portion is perpendicular to each of a upper and lower portion is fixedly connected to the circular door, and an other end of the z-shaped guide plate is provided with a notch mated with a portion of the L-shaped guide plate extending vertically, for guiding in the vertical direction, wherein the L-shaped guide plate is connected at a central portion of the bar-shaped plate.

7. The lift and rotation mechanism for a quick door-opening device according to claim 1, wherein the fixed connection between the circular disk and the coupling component is a connection effected by means of welding or by employing cooperation of bolts with screw holes.

8. The lift and rotation mechanism for a quick door-opening device according to claim 1, wherein the rotary shaft is a multi-stepped rotary shaft with a smaller end connected to the output shaft of the second motor.

9. The lift and rotation mechanism for a quick door-opening device according to claim 1, wherein wing plates formed in one piece with the supporting seat at both sides thereof are fixedly connected to the end flange.

* * * * *